No. 824,524.  
PATENTED JUNE 26, 1906.

H. A. BIERLEY.  
CHURN DASHER.  
APPLICATION FILED FEB. 23, 1906.

Witness  
W. M. Gentle  
N. Allmong.

Inventor  
Henry A Bierley  
by  
V. H. Lockwood.  
Attorney

UNITED STATES PATENT OFFICE.

HENRY A. BIERLEY, OF PORTSMOUTH, OHIO.

CHURN-DASHER.

No. 824,524. Specification of Letters Patent. Patented June 26, 1906.

Application filed February 23, 1906. Serial No. 302,619.

*To all whom it may concern:*

Be it known that I, HENRY A. BIERLEY, of Portsmouth, county of Scioto, and State of Ohio, have invented a certain new and useful Churn-Dasher; and I do hereby declare that the following is a full, clear, and exact description thereof, reference being had to the accompanying drawings, in which like figures refer to like parts.

The object of this invention is to provide a novel churn-dasher for use in churning milk to make butter. Its chief feature consists in a hollow flaring portion at the lower end with its walls perforated near the lower end thereof and with the upper end closed and the bottom open.

Another feature consists in having inclined wings extending laterally from the walls of said flaring portion for the purpose of causing the milk and butter to revolve as the churn-dasher is vertically operated.

Another feature consists in making a sharp lower annular edge to said flaring portion, so as to serve as a cutter to cut the globules of the milk.

These and the other features of my invention will be more fully understood from the acccompanying drawings and the following description and claims.

Figure 2:
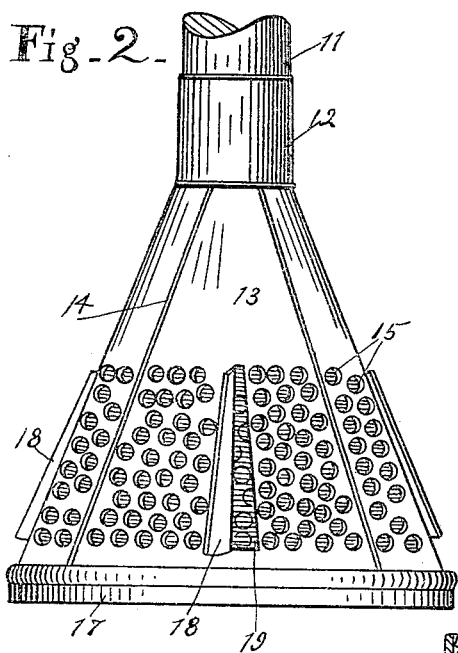
Figure 1:
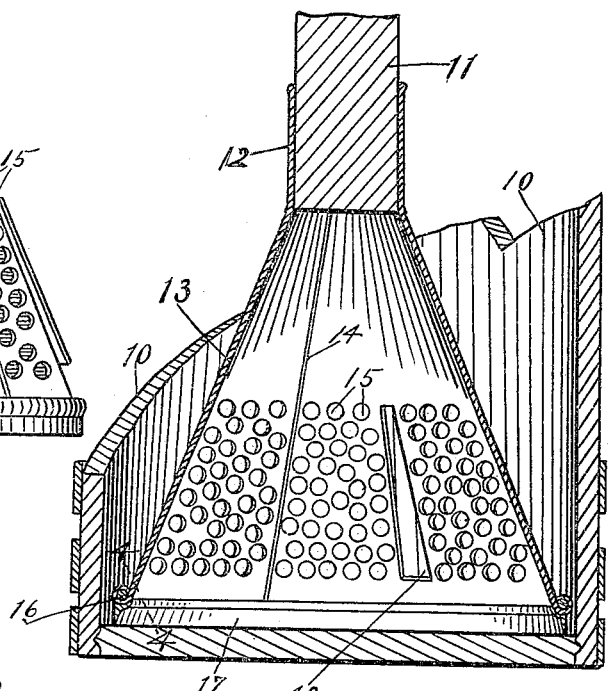
Figure 3:
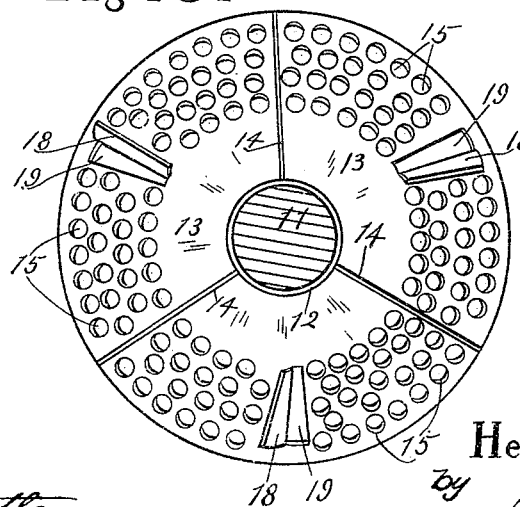
Figure 4:
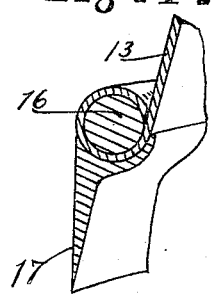

In the drawings, Figure 1 is a vertical central section of the lower part of a churn and a churn-dasher therein, parts broken away. Fig. 2 is a side elevation of the lower part of the churn-dasher. Fig. 3 is a plan view of what is shown in Fig. 2. Fig. 4 is a section on the line 4 4 of Fig. 1.

Any churn 10 of ordinary character may be used to contain the milk to be treated. 11 is the handle or upper portion of the churn-dasher, that is solid at its lower end and secured within a ferrule 12, extending from the upper end of the hollow flaring portion 13, that constitutes the low part of the churn-dasher. This flaring portion in the form herein shown is made of three parts of sheet metal connected together at the seams 14. The wall of the flaring portion 13 is provided with a great many perforations 15, located in the lower part thereof, so that the upper part of said flaring wall is imperforate and with the solid lower end of the handle forms a chamber from which air cannot escape excepting downwardly. The bottom of the flaring portion 13 is open and is reinforced by a wire 16 extending about it, and from said lower end there is an annular cutter 17 with a sharp edge extending downwardly so as to separate and cut the globules of milk and butter as the dasher is rapidly actuated downwardly. There are also wings 18 punched out of the walls of the flaring portion 13 of the dasher, leaving openings 19. These extend upwardly, and the wings are inclined from a vertical line, so that as the dasher is reciprocated it will agitate and cause the milk to circulate and move about in the churn. With this construction the edges of the perforations and the slots 19 and the cutter 17 break up the globules of milk and churn the same rapidly. The air-chamber in the upper part of the tapering portion prevents any upward escape of the air or milk, but forces the same downwardly and through the perforations 15. For these reasons this makes a very rapid and effective churn-dasher.

What I claim as my invention, and desire to secure by Letters Patent, is—

1. A churn-dasher with its lower portion hollow and flaring, the wall of said flaring portion being perforated and being open at the lower end and inclined, and outwardly-extending wings secured to the wall of said hollow portion that are inclined from a vertical line substantially as shown.

2. A churn-dasher with its lower portion hollow and flaring, the wall of said flaring portion being perforated, and the lower end being open with an annular downwardly-extending cutter.

In witness whereof I have hereunto affixed my signature in the presence of the witnesses herein named.

HENRY A. BIERLEY.

Witnesses:
N. ALLEMONG,
HELEN B. McCORD.